United States Patent [19]
Mizrahi

[11] Patent Number: 5,475,780
[45] Date of Patent: * Dec. 12, 1995

[54] OPTICAL WAVEGUIDING COMPONENT COMPRISING A BAND-PASS FILTER

[75] Inventor: Victor Mizrahi, Bedminster, N.J.

[73] Assignee: AT&T Corp., Murray Hill, N.J.

[ * ] Notice: The portion of the term of this patent subsequent to Oct. 10, 2017, has been disclaimed.

[21] Appl. No.: 78,992

[22] Filed: Jun. 17, 1993

[51] Int. Cl.$^6$ .................................................. G02B 6/293
[52] U.S. Cl. .............................. 385/37; 385/14; 385/15; 385/31; 385/46; 385/47
[58] Field of Search ............................... 372/6, 96, 102; 385/14, 15, 24, 27, 39, 45, 37, 31, 46, 47

[56] References Cited

U.S. PATENT DOCUMENTS

| | | | |
|---|---|---|---|
| 4,560,249 | 12/1985 | Nishiwaki et al. | 359/3 |
| 4,726,011 | 2/1988 | Ih et al. | 359/127 |
| 4,773,063 | 9/1988 | Hunsperger et al. | 359/130 |
| 4,901,306 | 2/1990 | Gardner | 359/125 |
| 4,923,271 | 5/1990 | Henry et al. | 359/130 |
| 4,926,412 | 5/1990 | Jannson et al. | 370/3 |
| 5,042,897 | 8/1991 | Meltz et al. | 385/37 |
| 5,063,559 | 11/1991 | Marcuse | 359/127 |
| 5,064,263 | 11/1991 | Stein | 385/14 |
| 5,093,876 | 3/1992 | Henry et al. | 385/28 |
| 5,107,359 | 4/1993 | Ohuchida | 359/124 |
| 5,195,161 | 3/1993 | Adar et al. | 385/129 |
| 5,206,920 | 4/1993 | Cremer et al. | 385/37 |
| 5,212,577 | 5/1993 | Nakamura et al. | 359/124 |
| 5,226,100 | 7/1993 | Maerz | 385/45 |
| 5,235,659 | 8/1993 | Atkins et al. | 385/124 |
| 5,283,686 | 2/1994 | Huber . | |
| 5,287,427 | 2/1994 | Atkins et al. | 385/124 |
| 5,309,260 | 5/1994 | Mizrahi et al. | 359/3 |
| 5,327,515 | 7/1994 | Anderson et al. | 385/123 |
| 5,351,324 | 9/1994 | Forman | 385/37 |

OTHER PUBLICATIONS

K. O. Hill et al., *Electronic Letters*, vol. 23, No. 9, 23 Apr. 1987, "Narrow–Bandwidth Optical Waveguide Transmission Filters," pp. 465–466.
F. Bilodeau et al., *IEEE Photonics Technology Letters*, vol. 6, No. 1, Jan. 1984, "High–Return–Loss Narrowband All–Fiber Bandpass Transmission Filter," pp. 80–82.
C. H. Henry et al., *Journal of Lightwave Technology*, vol. 7, No. 9, Sep. 1989, "Compound Bragg Reflection Filters Made by Spatial Frequency Doubling Lithography," pp. 1379–1385.
V. Mizrahi et al., *Journal of Lightwave Technology*, vol. 1, No. 10, Oct. 1993, "Optical Properties of Photosensitive Fiber Phase Gratings," pp. 1513–1517.
W. W. Morey et al., *Optics & Photonics News*, OSA 1993 Report, Feb. 1994, "Photoinduced Bragg Gratings in Optical Fibers," pp. 8–14.
V. Mizrahi et al., *Applied Physics Letters*, vol. 63, No. 13, Sep. 27, 1993, "Ultraviolet Laser Fabrication of Ultrastrong Optical Fiber Gratings and of Germania–doped Channel Waveguides," pp. 1727–1729.
M. C. Farries et al., *Electronic Letters*, vol. 28, No. 5, Feb. 27, 1992, "Broadband Chirped Fibre Bragg Filters for Pump Rejection and Recycling in Erbium Doped Fibre Amplifiers," pp. 487–489.
J. J. Pan et al., *Laser Focus World*, Jan. 1994, "Optoelectronic Components Make WDM Networks Practical," pp. 111–115.
Light–Sensitive Optical Fibres and Planar Waveguides; R. Kashyap, J. R. Armitage, R. J. Campbell, D. L. Williams, G. D. Maxwell, B. J. Ainslie, and C. A. Millar; BT Technol J, vol. 11, No. 2, Apr. 1993.

*Primary Examiner*—Brian Healy
*Attorney, Agent, or Firm*—Martin I. Finston

[57] ABSTRACT

An optical filter is adapted for selectively transmitting electromagnetic radiation within a wavelength passband bounded by a pair of stop bands of relatively low transmissivity. The filter includes at least one Bragg grating formed in a waveguiding optical medium. The Bragg grating has at least one wavelength band of relatively low transmissivity. This low-transmissivity band corresponds to at least a portion of one of the stop bands of the filter.

11 Claims, 6 Drawing Sheets

OPTICAL WAVEGUIDING COMPONENT COMPRISING A BAND-PASS FILTER

FIELD OF THE INVENTION

This invention relates to optical waveguiding bodies, such as optical fibers, that are made spectrally selective by forming Bragg gratings in these bodies. More particularly, the invention relates to spectrally selective waveguiding bodies that are used as optical bandpass filters or demultiplexers.

ART BACKGROUND

Wavelength-division multiplexing is a valuable technique for increasing the information capacity of an optical communication network. In a multiplexed network, it is essential to provide wavelength-selective components that can separate a particular wavelength channel from a group of multiplexed channels. It is advantageous to use Bragg gratings to provide spectral selectivity, because they are readily made with passbands that match desired channel widths, and because they are readily integrated with optical fibers. Channel-selective filters using Bragg gratings have, in fact, been reported. However, at least some of these filters suffer from relatively high coupling losses, and others are difficult to manufacture because they must be made to extremely close tolerances.

For example, one well-known filter configuration includes an input fiber coupled to a fiber-based Bragg grating through a directional optical coupler. Light reflected from the grating is coupled to an output waveguide through the same coupler. In this manner, the narrow reflection band of the grating is effectively transformed into a transmission band for the filter as a whole. However, this arrangement suffers 6 dB of coupling loss, to which is added the intrinsic loss in the directional coupler.

Another example is a filter described in K. O. Hill et al., "Narrow-Bandwidth Optical Waveguide Transmission Filters," *Electronics Letters* 23 (1987) 465–466. This filter consists of a loop of single-mode optical fiber which includes a fused-taper directional coupler at the point where the loop branches off from the straight part of the fiber. A Bragg grating is situated symmetrically midway in the fiber loop. This filter can be made to have relatively low loss. However, this filter is difficult to manufacture because exact placement of the Bragg grating is required in order to achieve the desired transmission characteristics.

Compound Bragg reflection filters made in planar waveguides are described in C. H. Henry et al., "Compound Bragg Reflection Filters Made by Spatial Frequency Doubling Lithography," *J. Lightwave Technol.* 7 (1989) 1379–1385. As reported therein, a filter having desirable spectral properties can be made by forming a Bragg grating having many, e.g., 15, sections, each with a different spatial period. To avoid phase shifts near 90° between sections, the sections are made contiguous, resulting in a grating period that is piecewise constant, but discontinuously varied. Henry et al. does not teach how to make such a filter in an optical fiber. Moreover, the filter of Henry et al. is relatively complicated to manufacture, and it would still be desirable to provide a filter that is simpler to manufacture.

SUMMARY OF THE INVENTION

We have developed an optical demultiplexer that includes a plurality of arms and an M×N coupler (typically, M=1) for distributing signals from at least one input waveguide, such as an optical fiber, into the plural arms. Each arm includes an optical channel-selective transmission filter that is convenient to manufacture and can be operated with relatively little loss. Each of these channel-selective filters includes at least one Bragg grating formed in a section of optical waveguide such as optical fiber. Each channel-selective filter has an optical transmission passband bounded on the long-wavelength and short-wavelength sides by spectral regions of relatively low transmissivity.

In a currently preferred embodiment of this demultiplexer, each channel-selective filter includes at least two Bragg gratings. Each of these gratings exhibits a spectral reflection peak, corresponding to relatively low transmissivity. This peak is bounded on the long-wavelength and short-wavelength sides by regions of lower reflectivity, and correspondingly higher transmissivity. The desired passband is achieved by offsetting the central wavelengths of the respective reflection peaks by a sufficient amount for the high-transmissivity region at the long-wavelength side of one of the peaks to overlap the high-transmissivity region at the short-wavelength side of the other peak. The extent of this overlap defines the transmission passband of the filter.

DETAILED DESCRIPTION

Figure 1:
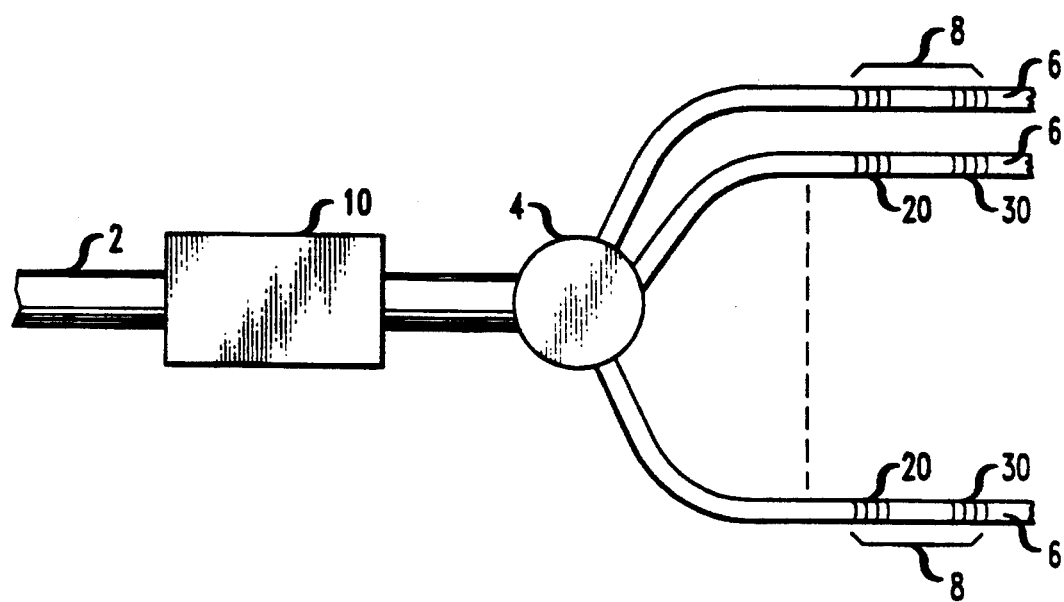
FIG. 1 is a schematic diagram of an optical demultiplexer according to the invention in one embodiment.

Illustrated in FIG. 1 is a demultiplexer according to the invention in one embodiment. A multiplexed signal, bearing information at a plurality of wavelengths, is directed by waveguiding medium 2 into, e.g., 1×N coupler 4. Coupler 4 distributes the multiplexed signal into plural arms 6, each of which includes a bandpass filter 8 corresponding to one of the demultiplexed signal channels. Before entering coupler 4, the multiplexed signal is optionally directed through filter 10. Filter 10 rejects wavelengths shorter than the shortest signal wavelength, and optionally also rejects wavelengths longer than the longest signal wavelength. Such a filter is useful for rejecting amplified spontaneous emission (ASE) from an optically amplified network, and may be more generally useful for excluding wavelengths that are inadequately stopped by filters 8. The function of filter 10 can be performed by well-known optical elements, such as multilayer interference filters.

Optical medium 2 and arms 6 exemplarily consist of single-mode optical fiber, and coupler 4 is exemplarily a fused-fiber coupler. However, we envisage the use of other waveguiding media as well, such as planar waveguides.

For optical fiber embodiments, we currently prefer to form filters 8 in single-mode, rather than multiple-mode, fiber because such filters are likely to be used in single-mode transmission systems. However, the use of a multiple-mode fiber may be desirable in some cases. For example, radiative losses may be minimized by using a section of multiple-mode fiber, which generally has better mode-field confinement than single-mode fiber. We believe that by carefully injecting a single-mode signal into such a fiber at a wavelength near cutoff, it is possible to avoid exciting any but the fundamental mode of the multiple-mode fiber.

Figure 2:
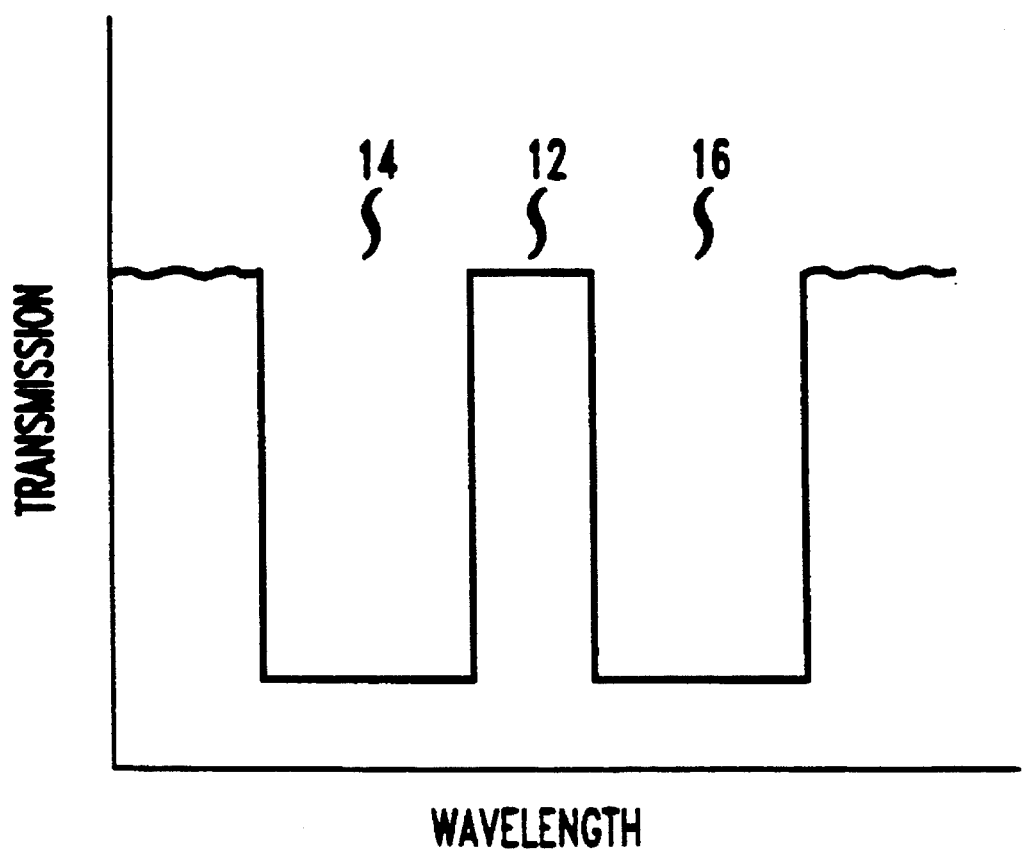
FIG. 2 is a schematic, idealized transmission spectrum of an optical band-pass filter according to the invention in one embodiment.

Depicted in FIG. 2 is an idealized transmission spectrum of one of filters 8, exhibiting passband 12, short-wavelength stop band 14, and long-wavelength stop band 16. The passband should be broad enough to pass one output channel, but not so broad that substantial crosstalk is admitted from neighboring channels. Stop band 14 should be broad enough to exclude all channels lying at shorter wavelengths than passband 12, and stop band 16 should be broad enough to exclude all channels lying at longer wavelengths than passband 12. We believe that passbands 5 Å or more in width, and even 10 Å or more in width, are readily made according to the methods described here. A filter having a passband at least 5 Å wide and at least one stop band that is 10 Å wide or more will be desirable for at least some applications currently envisaged in the field of optical communications. We believe that such a filter is also readily made according to the methods described here.

By way of example, we believe that a demultiplexer using filters of this kind will deliver respective signals into four or more output channels, each about 1.6 nm wide, with excluded channels attenuated by 25 dB or more. If there are, e.g., four channels, each stop band will typically be at least about 5 nm wide, in order to exclude up to three adjacent channels.

Each of filters 8 includes at least one Bragg grating formed in the optical medium of the corresponding arm. Each such grating will typically exhibit a reflection peak corresponding to wavelengths of light that satisfy the Bragg condition and are consequently back-reflected in such a way that the reflected radiation is substantially guided within the optical medium. Such a Bragg peak defines a spectral region of relatively low transmissivity. These peaks contribute to at least some of the stop bands of filters 8. Because relatively broad stop bands are generally required, it is often advantageous to make the filters from gratings having relatively broad Bragg peaks.

In fact, reflection phenomena distinct from the Bragg reflections described above, can also contribute to low-transmissivity regions of the grating spectrum. For example, a Bragg grating may cause radiation of certain wavelengths to be radiated out of the optical medium. This process is referred to herein as "radiative scattering."

Because the width of the reflection peak tends to increase with grating strength, it is often advantageous to use gratings that are relatively strong. (By a "strong" grating is meant a grating that has relatively great refractive index perturbations induced, e.g., by exposure to actinic radiation.) We have found that by using relatively strong gratings, useful filters can be made using as few as two gratings, and even as few as one grating. (However, it may in some cases be desirable to limit the grating strength, as discussed below.)

One method for forming filters 8 is to expose a suitable, photosensitive optical waveguiding medium to an interference pattern of actinic (typically, ultraviolet) radiation. This method is well known in the art and need not be described here in detail. An alternative method, especially useful for mass production, is to expose the medium to an interference pattern created by impinging a single actinic beam on a phase mask. A phase mask is a holographically patterned, diffractive medium that modulates the relative phase, rather than the amplitude, of the diffracted wavefronts. A phase mask is exemplarily made by reactive-ion etching of a fused-quartz substrate overlain by a chromium mask that has been patterned by electron-beam lithography. The use of phase masks to fabricate Bragg gratings is described in U.S. Pat. No. 5,327,515, issued to D. Z. Anderson et al. on Jul. 5, 1994.

To produce strong gratings, we currently prefer to expose optical fibers that have been sensitized by exposure to hydrogen gas. This technique is described, e.g., in U.S. Pat. No. 5,235,659, issued to R. M. Atkins et al. on Aug. 10, 1993, and in a continuation-in-part thereof, U.S. Pat. No. 5,287,427, issued to R. M. Atkins et al. on Feb. 15, 1994. Briefly, a silica-based optical fiber or other optical waveguide is exposed to hydrogen gas at a temperature of 250° C. or less and a hydrogen partial pressure of at least 1 atmosphere. Actinic irradiation of the resulting hydrogenated waveguide can result in a normalized refractive index change of $10^{-3}$ or more, and even as high as $10^{-2}$ or more. For example, AT&T 5D fiber, a commercially available optical communications fiber having a germanosilicate core, was exposed for 48–72 hours to 14.7 MPa of hydrogen at 75° C. Ultraviolet irradiation of the hydrogenated fiber produced a normalized index change of $1.8 \times 10^{-3}$.

Figure 3:
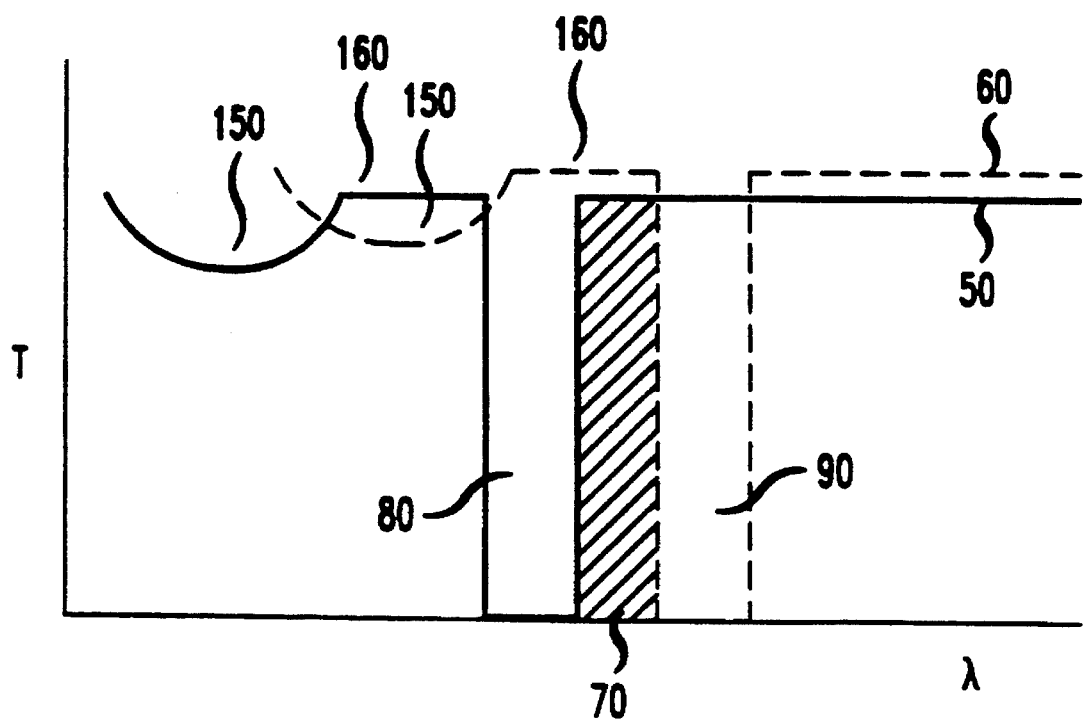
FIG. 3 schematically depicts the transmission characteristics of an optical filter comprising a pair of idealized Bragg gratings, according to the invention in one embodiment.

Depicted in FIG. 3 are idealized transmission spectra 50, 60 of typical Bragg gratings. Dips 150 in the transmissivity on the short-wavelength side of each transmission minimum 80, 90 are the result of radiative scattering. Each dip is separated from the corresponding transmission minimum by a gap 160 in which the transmissivity is relatively high. The short-wavelength edge of the reflection peak occurs roughly at $\lambda_{Bragg}^0$; i.e., the Bragg wavelength in the limit of a very weak grating. In this limit, the long-wavelength edge of the dip occurs at the wavelength $\lambda_{Bragg}^0 - \lambda_{offset}$. The wavelength interval $\lambda_{offset}$ in, e.g., a step-index fiber is given by $$\lambda_{offset} = \frac{\lambda_{Bragg}^0}{2} \left( 1 - \frac{n_{cl}}{n_{eff}} \right),$$

where $n_{cl}$ is the cladding refractive index, and $n_{eff}$ is the effective refractive index of the waveguiding medium.

We have found that as a grating increases in strength, radiative scattering tends to increase, the dip tends to increase in magnitude, and the gap tends to grow shorter (i.e., the onset of radiative scattering tends to shift toward longer wavelengths). This shortening of the gap is related to the increase in the average refractive index of the grating during the actinic exposure.

As discussed below, it may be desirable, in some cases, to have relatively strong radiative scattering and a pronounced dip, whereas in other cases it may be desirable to have a relatively small dip. If a small dip is preferable, it is desirable to form the gratings in an optical medium that exhibits relatively weak radiative scattering, or to limit the strength of the gratings. (It should be noted in this regard that the gratings can be made in a separate section of, e.g., fiber that is fused to different fibers at its input and output ends. Thus, the grating medium can be selected for desirable properties that may differ from those of the transmission medium.)

In general, a fiber (or other waveguiding medium) that strongly confines the mode field of guided radiation to the fiber core will exhibit relatively weak radiative scattering. A commercially available example of such a fiber is AT&T ACCUTETHER fiber, a 125-μm cladding diameter, single-mode, silica-based fiber which has a confinement of about 85% at a wavelength of 1.55 gm.

Within a given photosensitive optical medium, the grating strength, and thus the radiative scattering, can be limited by controlling the actinic exposure. If the medium is a hydrogen-treated germanosilicate glass waveguide, the strength can also be limited by controlling the amount of hydrogenation, or the amount of germanium in the waveguide core.

By contrast, one method to enhance the radiative scattering is to tilt the Bragg grating. That is, the refractive index perturbations that define an ordinary Bragg grating occur in planes perpendicular to the propagation axis. In a tilted grating, by contrast, these planes are tilted relative to the propagation axis. If, e.g., the Bragg grating is formed by an interference pattern of actinic radiation, tilted gratings are readily made by tilting the propagation axis of the waveguiding medium relative to the axis along which the interference pattern is periodic. A further advantage of tilted gratings is that because they can be effective for coupling reflected radiation into a radiative mode or a leaky mode (both of which exit the waveguiding medium), they can be designed to suppress back-reflected light that would otherwise be guided within the optical medium. Tilted gratings are described, e.g., in U.S. Pat. No. 5,042,897, issued to G. Meltz et al. on Aug. 27, 1991.

Figure 4:
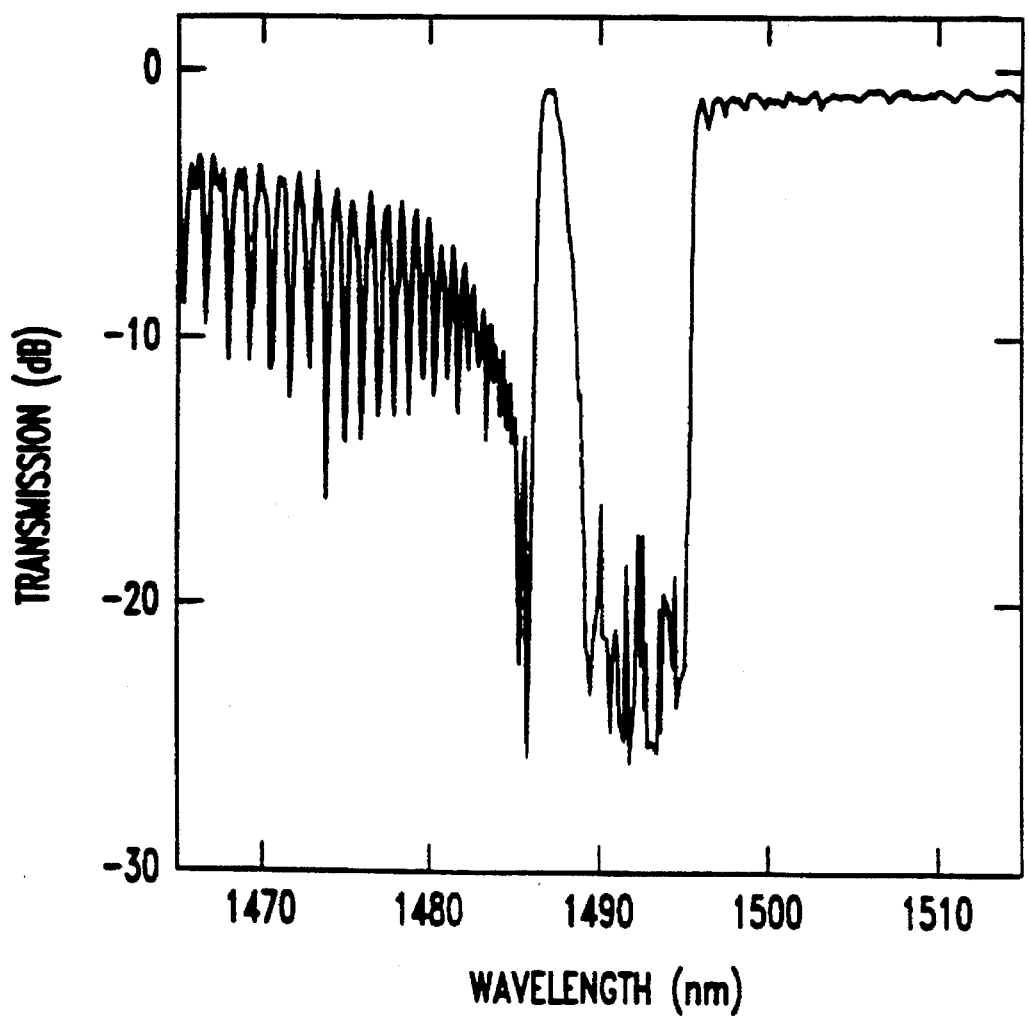
FIG. 4 is the transmission spectrum of an exemplary Bragg grating that has at most a slight, unintentional tilt, and exhibits strong radiative scattering.
Figure 5:
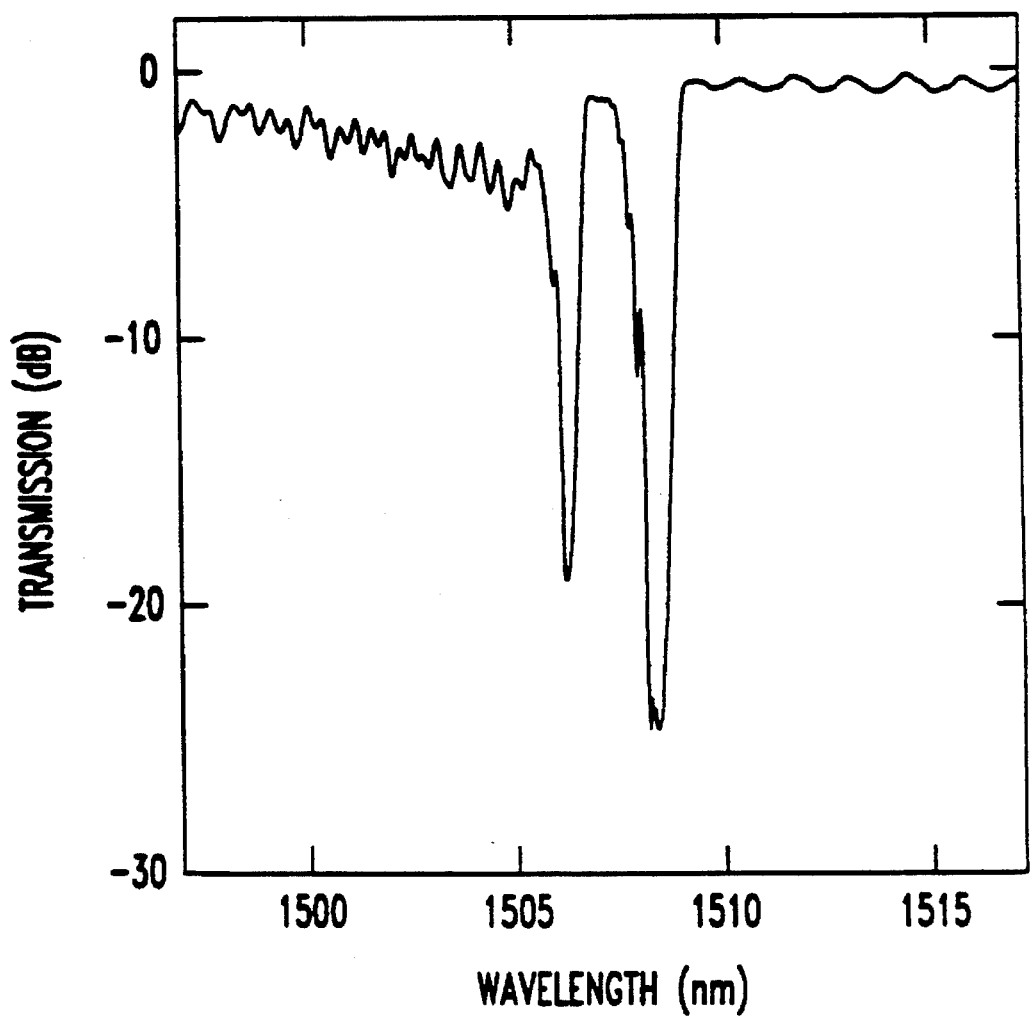
FIG. 5 is the transmission spectrum of an exemplary Bragg grating that is deliberately tilted.

By way of illustration, FIG. 4 is the transmission spectrum of a Bragg grating, having at most a slight, unintentional tilt, that exhibits strong radiative scattering, and FIG. 5 is the transmission spectrum of a deliberately tilted grating (in a fiber of different design). The spectrum of FIG. 5 exhibits a sharp maximum near 1506.5 nm that is attributable to a so-called "leaky" mode. The grating of FIG. 4 was formed by exposing hydrogen-treated, erbium-doped, germanosilicate-core fibers to ultraviolet radiation at a wavelength of 242 nm. The average uv power was 20–30 mW, and the exposure time was 3–7 minutes. The grating of FIG. 5 was made by treating a standard AT&T communication fiber with hydrogen, and subsequently exposing the fiber using a phase mask.

We have observed that the optical spectra of at least some Bragg gratings include narrow peaks and valleys that fall on the high-energy side of the main reflection peak, and may encroach on it. This generally undesirable fine structure is attributed to multiple reflections between the peripheral portions of the grating, which generally have a smaller average refractive index than the central portion. These reflections are believed to cause Fabry-Perot resonances, leading to the observed fine structure. A currently preferred method for eliminating this fine structure is to chirp the grating such that a given vacuum wavelength of light will not simultaneously satisfy the Bragg condition in both ends of the grating. This and other techniques are described in detail in U.S. Pat. No. 5,309,260, issued to V. Mizrahi et al. on May 3, 1994.

However, chirping tends to asymmetrically broaden the main reflection peak of the grating. A channel-selective filter for optical communication applications will generally require a relatively steep rolloff at the edges of the passband. Bragg gratings that are strongly chirped may fail to provide a rolloff that is steep enough. Consequently, it may in some cases be desirable to limit the amount of chirp.

Significantly, we have found it advantageous, when a chirped grating is used, to chirp the grating continuously. Thus, the resulting grating has a spatial period that is constant or continuously varied in the neighborhood of every longitudinal position therewithin.

A further method for suppressing the fine structure involves using tilted gratings. That is, the Fabry-Perot resonances can be reduced or eliminated by causing the light reflected in the Bragg gratings to radiate out of the fiber (or other waveguiding medium). This can be achieved by tilting the Bragg gratings, as discussed above.

FIG. 3 illustrates one method for forming a channel-selective filter. The offset between the stop bands of spectra 50 and 60 leads to formation of a narrow passband 70 with respect to electromagnetic radiation that is transmitted through both the grating corresponding to spectrum 50 and the grating corresponding to spectrum 60. This passband is bounded on one side by the stop band of spectrum 50, and on the other side by the stop band of spectrum 60. Thus, with reference to FIG. 1, a channel-selective filter is readily made by incorporating two such offset gratings 20, 30 in an optical fiber or other waveguiding medium. In fact, the transmission spectra of three or even more gratings can be similarly superimposed by incorporating such gratings in a waveguiding medium. Additional gratings beyond two may be useful, e.g., for broadening the stop bands of the resulting optical filter. (In such cases, it will generally be necessary to suppress Fabry-Perot resonances between spectrally overlapping gratings.)

Figure 6:
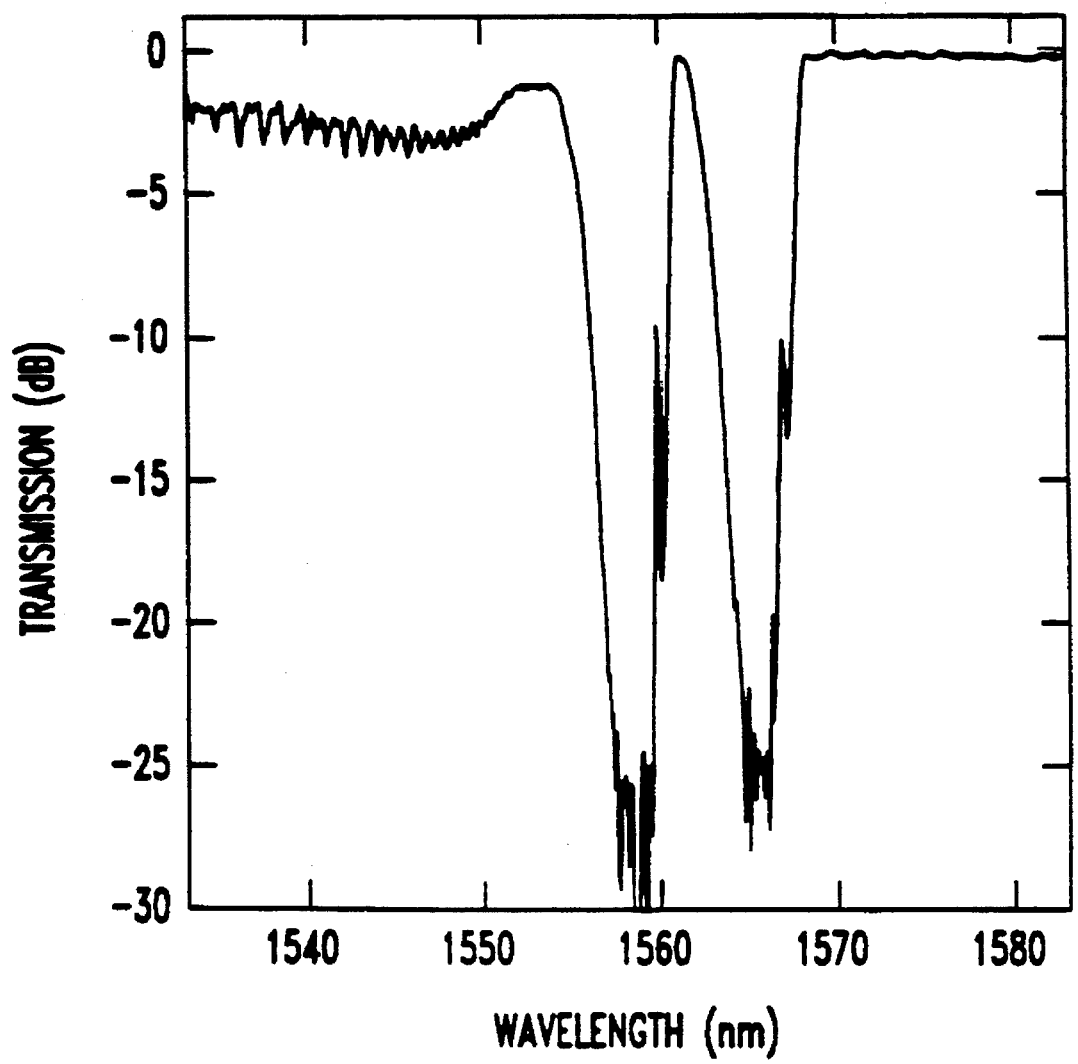
FIG. 6 is a transmission spectrum of an exemplary, practical embodiment of the filter of FIG. 3.

FIG. 6 is a transmission spectrum of an exemplary embodiment of the channel-selective filter of FIG. 3. To make this filter, a pair of Bragg gratings were formed, without any intentional tilt, in a hydrogen-treated, high numerical aperture, single-mode fiber having tight mode-field confinement.

It is evident that the filter of FIG. 3 will exclude wavelengths, on either side of the passband, over a spectral range roughly equal to a reflection bandwidth of one of the Bragg gratings. For use as, e.g., as a channel-selective filter in one arm of a demultiplexer, it is desirable for the filter to exclude all the other channels. Thus, an illustrative demultiplexer having four channels, each 1.6 NM wide, would require reflection bandwidths of at least about 5 nm in order to exclude three adjacent channels. Moreover, it is desirable in many applications for the excluded channels to be attenuated by at least 25 dB.

Referring again to FIG. 3, it will be apparent that if dip 150 is very pronounced, it may overlap passband 70 and consequently reduce the total transmission in the passband. This will generally be undesirable, but may in some cases be acceptable.

In some cases, the dip will be useful for creating a channel-selective filter that uses only a single grating. That is, with reference to spectrum 60 of FIG. 3, it is possible, in at least some optical fibers (or other waveguiding media) to make dip 150 prominent enough to attenuate radiation by 10 dB or more over a bandwidth of 0.5 nm or more lying on the short-wavelength side of gap 160. In such a case, the dip will correspond substantially to stop band 14 of FIG. 2, the reflection peak will correspond substantially to stop band 16, and gap 160 will correspond substantially to the passband of the filter.

As noted, FIG. 4 is the transmission spectrum of a grating of this kind made in an optical fiber. The portion of this spectrum lying on the short-wavelength side of the passband exhibits the effects of radiation-mode coupling. As a result of Fabry-Perot resonance effects associated with multiple reflection within the fiber cladding, this portion also exhibits fine structure. We believe that this fine structure can be suppressed by surrounding the fiber with a lossy material, such as a suitable polymeric jacket material, that has a refractive index at least that of the fiber cladding.

As noted, Fabry-Perot resonance effects can produce undesirable spectral fine structure. Yet another context in which effects of this type appear is provided when a pair of, e.g., adjacent Bragg gratings have the same, or nearly the same, period. In such a case, reflected light can resonate between the two gratings. This may, e.g., affect channel-selective filters having more than two gratings. It can also affect the performance of broadband rejection filters made from Bragg gratings. That is, it is convenient to make a broadband rejection filter by creating two or more Bragg gratings in a segment of optical fiber or other waveguiding medium. The periods of the gratings are closely spaced, such that the respective reflection peaks overlap. We believe that a rejection band 10 nm or more in width can readily be made by this method. A broad bandpass filter is readily made from two of these rejection filters having offset rejection bands. Such a bandpass filter is conveniently used, e.g., as ASE filter 10 of FIG. 1. However, Fabry-Perot fine structure may degrade the performance of this filter. Tilted gratings, as described above, are useful for suppressing this fine structure.

Because radiative scattering is beneficial in this context, it may be desirable to form such a broadband filter in a section of, e.g., optical fiber of a type that only weakly confines the mode field of guided radiation to the fiber core. This fiber section can then be joined to one or more channel-selective filters formed in fiber sections having strong mode-field coupling.

I claim:

1. An optical demultiplexer comprising an input waveguide, at least two output waveguides, means for splitting optical transmissions from the input waveguide into the output waveguides, and wavelength-selective means for selectively transmitting electromagnetic radiation within a respective, distinct wavelength passband in each of the output waveguides, wherein:
   a) the wavelength-selective means comprise a respective optical filter included in each of the output waveguides, such that wavelength selection takes place after the splitting of the optical transmissions by said splitting means;
   b) each of said filters is adapted for selectively transmitting electromagnetic radiation within a passband of wavelengths and at least partially excluding electromagnetic radiation in first and second stop bands of wavelengths adjacent and respectively above and below the passband;
   c) each of said filters comprises a set of one or more Bragg gratings;
   d) each of said Bragg gratings has at least one wavelength band of relatively low transmissivity; and
   e) each of said low-transmissivity bands coincides with at least a portion of one of the stop bands of the corresponding filter.

2. Apparatus of claim 1, wherein the input waveguide and the output waveguides are optical fibers.

3. Apparatus of claim 1, wherein:
   a) each of the optical filters comprises at least a first and a second Bragg gratings, each said grating having, respectively, a first and a second wavelength band of relatively low transmissivity, wherein the first stop band comprises the corresponding first low-transmissivity band, and the second stop band comprises the corresponding second low-transmissivity band.

4. Apparatus of claim 1 further comprising an optical broad-band filter for limiting the optical transmissions that are split from the input waveguide into the output waveguides to a predetermined range of wavelengths that includes the passbands of all of the optical filters.

5. Apparatus of claim 4, wherein:
   a) the optical broadband filter comprises at least two Bragg gratings, to be referred to as first and second BBF gratings, respectively;
   b) said BBF gratings have, respectively, a first and a second BBF wavelength band of relatively low transmissivity; and
   c) the first and second BBF low-transmissivity bands overlap such that the optical broadband filter has at least one wavelength band of relatively low-transmissivity that is broader than either of said first and second BBF low-transmissivity bands.

6. Apparatus of claim 5, wherein at least the first BBF grating is tilted such that multiple reflections that would otherwise occur between the first and second BBF gratings are suppressed.

7. Apparatus of claim 1, wherein each of the passbands is at least 5 Å wide.

8. Apparatus of claim 1 wherein each of the passbands is at least 10 Å wide.

9. Apparatus of claim 1, wherein, with respect to each of the output waveguides:
   a) the corresponding passband is at least 5 Å wide; and
   b) at least one of the corresponding stop bands is at least 10 Å wide.

10. Apparatus of claim 1, wherein each of said Bragg gratings has a spatial period that is constant or continuously varied in each portion thereof.

11. Apparatus of claim 1 wherein:
    a) each of the optical filters comprises a glass waveguiding medium having a core characterized by a core refractive index; and
    b) each of the Bragg gratings is at least partly defined by a repetitive pattern of perturbations of the core refractive index.

\* \* \* \* \*